Patented July 8, 1952

2,602,793

UNITED STATES PATENT OFFICE 2,602,793

8-HALOXANTHINE SALTS OF N-DIALKYL-AMINOALKYL- N -ARYLMETHYL-α-AMINO-PYRIDINES

John W. Cusic, Skokie, Ill., assignor to G. D. Searle & Co., Chicago, Ill., a corporation of Illinois No Drawing. Application December 10, 1949, Serial No. 132,411

18 Claims. (Cl. 260—253)

This invention relates to salts of N-tertiary-aliphatic - aminoalkyl - N - arylmethyl - amino-pyridines with 8-haloxanthines which contain a hydrogen atom in position 7, and to the production thereof. In particular this invention relates to salts of organic bases of the general structural formula

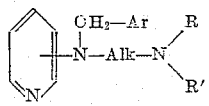

wherein Ar is an aryl radical, Alk is an alkylene radical and R and R' are alkyl radicals, with 8-haloxanthines which contain a hydrogen atom in position 7.

This application is a continuation-in-part of my prior applications Serial No. 71,763, filed January 19, 1949, now Patent No. 2,534,235, dated December 19, 1950, and Serial No. 745,630, filed May 2, 1947, now abandoned.

In the foregoing structural formula Ar represents a monocarbocyclic aromatic radical and includes phenyl, p-chlorophenyl, p-bromophenyl, o - chlorophenyl, p - methoxyphenyl, p - ethoxyphenyl, o-methoxyphenyl, 2,4-dimethoxyphenyl, 2,4-dichlorophenyl and related radicals of the benzene series. Alk represents a bivalent saturated aliphatic hydrocarbon radical containing at least two and not more than five carbon atoms. It includes alkylene radicals such as ethylene, propylene, butylene, trimethylene, and amylene. R and R' are lower alkyl radicals containing not more than eight carbon atoms, and include methyl, ethyl, propyl, isopropyl, butyl, isobutyl, amyl, hexyl, heptyl and octyl radicals.

It is recognized that organic bases of the foregoing structural formula, which are widely used as antihistaminic drugs, elicit certain undesirable side reactions and toxic manifestations, the most common of which are drowsiness and dizziness. It is the object of this invention to produce new therapeutic substances which are relatively free from such untoward reactions. Another object is to produce salts of antihistaminic agents and haloxanthines which have reduced toxicity. A further object is to produce such salts having enhanced therapeutic efficacy. Other objects will be apparent to those skilled in the art in view of the disclosure given herein.

I have discovered that salts of organic bases of the foregoing formula with haloxanthines produce little effect on the central nervous system and appear to be more useful therapeutically than any of the individual components alone. Such salts exert a potentiating effect and show enhanced activity in combatting the effects of histamine. They are particularly useful in the treatment of anaphylaxis and allergic disorders. Certain of the salts within the scope of this invention are so free from undesirable side effects that they may be used in the treatment and prevention of motion sickness.

Among the halogenated xanthines to which this invention pertains are the chloro, bromo, and iodo derivatives of theophylline and related xanthines which have a hydrogen atom in position 7.

In particular this invention is concerned with acidic xanthines such as 8-chlorotheophylline
8-bromotheophylline
8-chloroxanthine
3-methyl-8-chloroxanthine
8-bromoxanthine
3-methyl-8-bromoxanthine
1,3-diethyl-8-bromoxanthine
1,3-diethyl-8-chloroxanthine
8-iodotheophylline
8-iodo-1,3-diethylxanthine Compositions of organic bases and haloxanthines are readily prepared by dissolving the base in a suitable solvent and treating the resulting solution with a solution of a halogenated xanthine. Solvents which are satisfactory for this reaction include the lower alcohols and ketones and their mixtures with water, ethers and hydrocarbons. Generally small excesses of the organic bases are desirable in these synthetic procedures. The desired salt generally crystallizes out of the solution on chilling or standing, or may be precipitated by addition of a solvent such as ether or benzene. A simple and efficient alternative method is that of heating together at 50–100° C. equivalent amounts of the liquid organic base and of the haloxanthine, with good mixing with a small amount of water or alcohol. As the materials react the mixture generally forms a thick paste or granular solid. On chilling the product becomes hard and solid and may be broken up, ground to a powder and dried. The compounds of this invention can also be produced by refluxing a solution of an ammonium salt of a haloxanthine in a lower alcohol or ketone with an equivalent of the organic base. During the heating, ammonia is evolved and the haloxanthine salt of the organic base is formed. On chilling this salt precipitates.

The following examples illustrate in more de-

Example 1

A mixture of 15 g. of N-β-dimethylaminoethyl-N-benzyl-α-aminopyridine (also known as N-benzyl - N',N' - dimethyl - N - α - pyridylethylenediamine and as tripelennamine), which has the formula

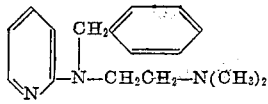

and 10 g. of 8-chlorotheophylline is dissolved in 75 cc. of hot alcohol and 25 cc. of hot water. The solution thus formed is refrigerated and after dilution with ether the N-β-dimethylaminoethyl-N-benzyl-α-aminopyridine salt of 8-chlorotheophylline separates as a light yellow viscous oil which is soluble in water. The aqueous solution of the salt forms a precipitate when treated with acid or alkali. The oily salt is dried at about 65° C. for several days during which time it partially crystallizes. It is further dried in a desiccator at room temperature and is converted into crystals which melt at 106-108° C.

Example 2

The 8-bromotheophylline salt of N-β-dimethylaminoethyl - N - benzyl-α-aminopyridine is produced as in Example 1 from 15 g. of N-β-dimethylaminoethyl -N- benzyl - α - aminopyridine and 12 g. of 8-bromotheophylline in 100 cc. of boiling methyl ethyl ketone containing 5 cc. of water. The boiling solution is filtered, evaporated and triturated with cold ether. The residual salt on analysis showed 15.3% bromine; the calculated value is 15.5%.

Example 3

A mixture of 6.5 g. of N-p-chlorobenzyl-N-β-dimethylaminoethyl-α-aminopyridine, which has the formula

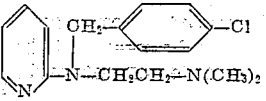

and 4 g. of 8-chloroxanthine are dissolved in a boiling mixture of 50 cc. of methyl ethyl ketone, 10 cc. of ethanol and 5 cc. of water. The hot solution is filtered and evaporated on a steam bath. The residue of the 8-chloroxanthine salt of N-p-chlorobenzyl-N',N'-dimethyl-N - α - pyridylethylenediamine is washed with cold alcohol, triturated with ether and dried. A sample on analysis showed 14.99% chlorine; the calculated value is 14.87%.

Example 4

The 8-chlorotheophylline salt of N-benzyl-N-β-diethylaminoethyl-α-aminopyridine, which has the formula

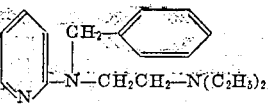

is produced as in Example 1 from 15 g. of the base and 10 g. of 8-chlorotheophylline. After isolation it is triturated with ether and dried. A sample on analysis showed 6.97% chlorine; the calculated value is 7.13%.

Example 5

7 g. of N-β-dimethylaminoethyl-N-p-methoxybenzyl-α-aminopyridine (which is also called N-p-methoxybenzyl-N',N'-dimethyl-N-α-pyridylethylenediamine, and which is known in commerce as pyranisamine), which has the formula

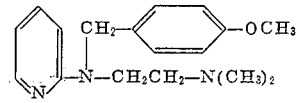

and 4 g. of 8-chlorotheophylline are dissolved in 50 cc. of boiling methyl ethyl ketone containing 2 cc. of water. The boiling solution is filtered and evaporated. The glassy residue of the 8-chlorotheophylline salt of N-β-dimethylaminoethyl-N-p-methoxybenzyl-α-aminopyridine is crystallized from ethyl acetate. It melts at 131-132° C.

I claim:

1. An 8-haloxanthine salt of an N-dialkylaminoalkyl - N - arylmethyl - α - aminopyridine, wherein the 8-haloxanthine has a hydrogen atom in position 7, the alkyl radicals are lower alkyl radicals and the aryl radical is monocyclic.

2. An 8-halotheophylline salt of an N-dialkylaminoalkyl - N - arylmethyl - α - aminopyridine, wherein the alkyl radicals are lower alkyl radicals and the aryl radical is monocyclic.

3. An 8-halotheophylline salt of an N-dialkylaminoalkyl-N-benzyl -α- aminopyridine, wherein the alkyl radicals are lower alkyl radicals.

4. An 8-halotheophylline salt of an N-dimethylaminoalkyl-N-benzyl -α- aminopyridine, wherein the alkyl radical is a lower alkyl radical.

5. An 8-chlorotheophylline salt of an N-dimethylaminoalkyl -N- benzyl - α - aminopyridine, wherein the alkyl radical is a lower alkyl radical.

6. An 8-bromotheophylline salt of an N-dimethylaminoalkyl -N- benzyl - α - aminopyridine, wherein the alkyl radical is a lower alkyl radical.

7. The 8-chlorotheophylline salt of N-β-dimethylamoniethyl-N-benzyl-α-aminopyridine.

8. The 8-bromotheophylline salt of N-β-dimethylaminoethyl-N-benzyl-α-aminopyridine.

9. An 8-halotheophylline salt of an N-dialkylaminoalkyl-N-p-alkoxybenzyl -α- aminopyridine, wherein the alkyl radicals are lower alkyl radicals.

10. An 8-halotheophylline salt of an N-dimethylaminoalkyl -N-p-methoxybenzyl-α-aminopyridine, wherein the alkyl radical is a lower alkyl radical.

11. An 8-chlorotheophylline salt of an N-dimethylaminoalkyl -N- methoxybenzyl -α- aminopyridine, wherein the alkyl radical is a lower alkyl radical.

12. An 8-bromotheophylline salt of an N-dimethylaminoalkyl-N-p-methoxybenzyl-α-aminopyridine, wherein the alkyl radical is a lower alkyl radical.

13. The 8-chlorotheophylline salt of N-β-dimethylaminoethyl-N-p-methoxybenzyl-α-aminopyridine.

14. The 8-bromotheophylline salt of N-β-dimethylaminoethyl-N-p-methoxybenzyl-α-aminopyridine.

15. The process of producing an 8-haloxanthine salt of an N-dialkylaminoalkyl-N-arylmethyl-α-aminopyridine which comprises reacting an 8-haloxanthine which contains a hydrogen atom in position 7 with at least one equivalent of an N - dialkylaminoalkyl - N - arylmethyl-α-aminopyridine wherein the alkyl radicals are lower alkyl radicals and the aryl radical is monocyclic, in a hot inert, water miscible organic solvent, and separating the salt thus formed.

16. The process of producing the 8-chlorotheophylline salt of N-β-dimethylaminoethyl-N-benzyl-α-aminopyridine which comprises reacting 8-chlorotheophylline with at least one equivalent of N-β-dimethylaminoethyl - N - benzyl-α-aminopyridine in hot alcohol, and separating the salt thus formed.

17. The process of producing the 8-chlorotheophylline salt of N-β-dimethylaminoethyl-N-p-methoxybenzyl-α-aminopyridine which comprises reacting 8-chlorotheophylline with at least one equivalent of N-β-dimethylaminoethyl-N-p-methoxybenzyl-α-aminopyridine in hot methyl ethyl ketone, and separating the salt thus formed.

18. An 8-halotheophylline salt of N-p-methoxybenzyl-N',N'-dimethyl -N-α- pyridylethylenediamine.

JOHN W. CUSIC.

REFERENCES CITED

The following references are of record in the file of this patent:

UNITED STATES PATENTS

| Number | Name | Date |
| --- | --- | --- |
| 2,499,058 | Cusic | Feb. 28, 1950 |